United States Patent
Moser et al.

(10) Patent No.: US 8,647,033 B2
(45) Date of Patent: Feb. 11, 2014

(54) TOOL FOR MACHINING A WORK PIECE AND METHOD FOR MACHINING A WORK PIECE

(75) Inventors: Rudolf Moser, Ried (CH); Claus Kobialka, Marbach a.N. (DE); Matthias Schmidt, Besigheim (DE); Helmut Schuster, Denklingen (DE)

(73) Assignees: Gleanson-Pfauter Maschinenfabrik GmbH, Ludwigsburg (DE); Schuster Maschinenbau GmbH, Denklingen (DE)

( * ) Notice: Subject to any disclaimer, the term of this patent is extended or adjusted under 35 U.S.C. 154(b) by 971 days.

(21) Appl. No.: 12/669,201

(22) PCT Filed: Jul. 25, 2008

(86) PCT No.: PCT/EP2008/006149
§ 371 (c)(1),
(2), (4) Date: Apr. 16, 2010

(87) PCT Pub. No.: WO2009/013012
PCT Pub. Date: Jan. 29, 2009

(65) Prior Publication Data
US 2010/0202847 A1 Aug. 12, 2010

(30) Foreign Application Priority Data

Jul. 25, 2007 (DE) .................... 20 2007 010 461 U
Oct. 26, 2007 (DE) ......................... 10 2007 051 375

(51) Int. Cl.
*B23P 15/14* (2006.01)
*B23Q 39/00* (2006.01)
*B23P 23/00* (2006.01)

(52) U.S. Cl.
USPC .................. 409/11; 409/40; 409/55; 29/27 C; 29/28

(58) Field of Classification Search
USPC ..... 409/40, 11, 7, 55, 201; 29/27 C, 27 R, 28
See application file for complete search history.

(56) References Cited

U.S. PATENT DOCUMENTS 2,206,443 A * 7/1940 Barter et al. ...................... 409/8
4,590,661 A * 5/1986 Lunazzi ........................... 483/18
(Continued)

FOREIGN PATENT DOCUMENTS

DE 3630484 A1 * 4/1987 ............... B23F 5/00
DE 19904859 A1 8/2000
(Continued)

OTHER PUBLICATIONS

International Search Report and Written Opinion (in English) for PCT/EP2008/006149.

*Primary Examiner* — David Bryant
*Assistant Examiner* — Jason L Vaughan
(74) *Attorney, Agent, or Firm* — Robert L. McDowell

(57) ABSTRACT

The invention relates to a machine tool for machining a work piece having a main spindle unit with a preferably vertical spindle axis, and a machining spindle unit, particularly a hobbing spindle unit that is arranged next to the spindle axis in a direction crosswise to the spindle axis to accommodate a machining tool, with said machining spindle unit being displaceable along a first guiding direction, in particular vertically (Z) by means of a first guide and crosswise, preferably perpendicularly (X) or approximately perpendicularly displaceable to the first guiding direction, particularly the vertical, by means of a second guide, can advance to a work piece clamped in the main spindle unit, and can swivel around a swivel axis (B), preferably perpendicularly to the spindle axis (A) of the machining spindle unit, and with the machining tool having an arbitrary number of helically arranged machining elements, in particular a single- or multi-threaded generating means, adapted to execute generating teeth manufacturing methods.

25 Claims, 4 Drawing Sheets

(56) References Cited

U.S. PATENT DOCUMENTS

Figure 1:
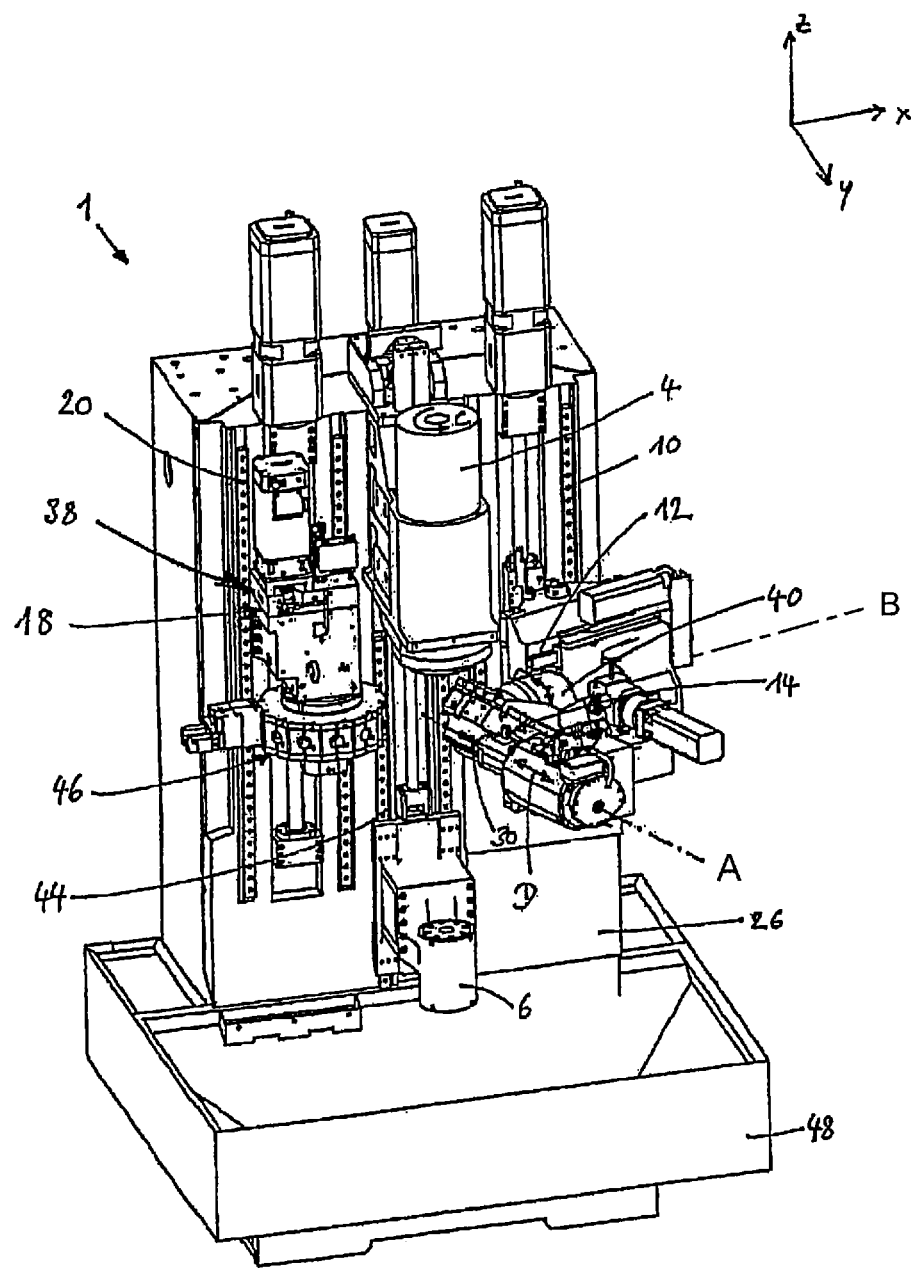

| | | | |
|---|---|---|---|
| 4,822,217 A * | 4/1989 | Lunazzi | 409/11 |
| 4,961,289 A | 10/1990 | Sulzer | |
| 5,205,806 A * | 4/1993 | Ishida et al. | 483/18 |
| 5,228,814 A | 7/1993 | Suwijn | |
| 5,490,307 A * | 2/1996 | Link | 29/27 C |
| 6,079,090 A | 6/2000 | Ongaro | |
| 6,618,917 B2 * | 9/2003 | Sugiura et al. | 29/27 C |
| 7,232,406 B2 * | 6/2007 | Komizo | 483/3 |
| 7,266,871 B2 * | 9/2007 | Takeuchi et al. | 29/27 C |
| 7,451,533 B2 * | 11/2008 | Kawasumi et al. | 29/27 C |
| 7,784,162 B2 * | 8/2010 | Hessbruggen et al. | 29/27 C |
| 8,151,437 B2 * | 4/2012 | Müller et al. | 29/563 |
| 2006/0174464 A1 * | 8/2006 | Fitzgerald et al. | 29/56.5 |
| 2008/0213055 A1 | 9/2008 | Ozdyk et al. | |

FOREIGN PATENT DOCUMENTS

| | | | | |
|---|---|---|---|---|
| DE | 102004012385 B3 | 9/2005 | | |
| DE | 10325421 B4 | 3/2006 | | |
| EP | 0282046 A | 9/1988 | | |
| JP | 60146622 A * | 8/1985 | | B23F 23/12 |
| JP | 63127814 A * | 5/1988 | | B23F 5/20 |
| JP | 63156616 A * | 6/1988 | | B23F 5/22 |
| JP | 09-290301 A | 11/1997 | | |
| JP | 2002-103139 A | 4/2002 | | |
| WO | 2007/012351 A | 2/2007 | | |

* cited by examiner

TOOL FOR MACHINING A WORK PIECE AND METHOD FOR MACHINING A WORK PIECE

The invention relates to a machine tool for machining a work piece comprising a main spindle unit having a preferably vertically oriented spindle axis, the work piece being clampable into said main spindle unit for the purpose of machining, and a machining spindle unit, e.g. a hobbing spindle unit that is arranged next to the vertical spindle axis of the main spindle unit in a direction running crosswise to the spindle axis of the main spindle unit, for accommodating a machining tool and a machining method which may be executed on the machine.

In the machining of geared work pieces there is a difference between indexing methods and generating methods. Indexing methods are understood by the skilled person as those methods wherein the final shape of the work piece obtained by machining is determined by the shape of the machining tool. The desired shape is obtained more or less as the mirror image of the shape of the machining tool.

On the other hand, the expression generating method is understood by the skilled person as defining those methods wherein the final shape of the work piece obtained by the machining process is the result of the cooperation of the shape of the machining tool and a relative movement between work piece and machining tool. By means of a generating method, different work piece geometries may be obtained with one and the same machining tool by appropriately selecting the relative movement between the work piece and the machining tool. Generally, in conducting generating methods the machining tool as well as the work piece are rotated around respective spindle axes under the control of adequate synchronizing means. Concurrently, a translational movement between the work piece and the machining tool may be effected during machining. In the course of machining a work piece different machining tools may come to use. Work pieces may be turned, milled, ground, honed, shaved, hobbed etc. Examples for generating gearing methods are hobbing, threaded wheel grinding, gear shaving, gear honing and pressure gear deburring. In known machine tools, turrets are provided for executing different machining operation, which turrets enable use of different tools for machining a work piece clamped into the main spindle unit. Machine tools of this type provided with a turret are described in DE 103 25 421 B4, for example.

In use of indexing machine tools of the above-described type, in many cases deviations of the work piece geometry obtained by machining from a given desired geometry are observed.

With view to these problems in the prior art the invention is directed to the problem of enabling an unlimited precise machining of work pieces wherein by said machining a tooth structure or a toothing like gear pinions, cylindrical gears or the like may be formed.

According to a first aspect of the invention this problem is solved by an improvement of the known machine tool which essentially is characterized in that the machining spindle unit can be displaced along a first guiding direction by means of a first guide, in particular along a vertical direction, and can be displaced crosswise to the first guiding direction by means of a second guide, preferably perpendicularly to the first guide, especially preferably perpendicularly to the vertical direction, where the machining spindle unit can be advanced to the work piece clamped in the main spindle unit and may be swiveled around a swivel axis which is arranged crosswise in particular perpendicularly to the main spindle axis and/or perpendicularly to the main spindle axis and the axis of the machining spindle unit respectively, wherein the machining tool comprises means having a single or plurality of helically arranged machining elements, i.e. an arbitrary number of machining elements, adapted for executing a generating teeth manufacturing method.

In case a plurality of helically arranged machining elements is used, those machining elements may form two or more, i.e. an arbitrary number of windings, i.e. may form a multi-threaded generating means.

Throughout this application a milling spindle unit/a milling tool adapted to execute generating teeth manufacturing methods is identified as a hobbing spindle unit. Further, a milling process executed in the course of a generating teeth manufacturing method is identified as hobbing.

In the inventive machine tool all movements necessary for conducting generating teeth manufacturing methods with the exception of the rotational movement of the work piece may be realized by effecting a rotational and a translational movement of the working tool.

Thereby stable coupling of the work piece to a machine tray of the machine tool is made possible. It has been shown that a particularly high process stability with view to the accuracy of the final geometry of the work piece obtained may be insured by these measures. This improvement is based on the fact that no translational movement of the work piece with corresponding inaccuracy has to be effected and that coupling of the work piece to the machine frame may be realized in a particularly stable manner where the intended improvement is obtained in particular by the fact that a translational movement of the tool to be used for machining may be effected with a much higher precision where possible inaccuracies may be compensated by appropriate selection of the tool itself.

The machining tool of an inventive machine tool comprises generating means with a single or a plurality of machining elements where this means may be realized by milling means with a single or a plurality of machining elements. In a preferred embodiment of the invention the spindle axis of the main spindle unit is orientated in the direction of gravity (vertically).

In a preferred embodiment of the invention the main spindle unit comprises rotational drive means where the machining tool can be driven in rotation with the machining spindle unit. Given the main spindle axis is orientated vertically, the work piece may be clamped vertically standing or vertically hanging into the main spindle unit.

Further, the machine tool comprises a machining spindle unit, like a milling spindle unit for accommodating a machining tool, like a milling tool, which is arranged next to the spindle axis of the main spindle unit. The accommodated tool can be driven in rotation with the machining spindle unit, i.e. may be rotated around the spindle axis of the machining spindle unit.

By means of the first guide, the machining spindle unit can be displaced longitudinally along a first guiding direction running essentially parallel to the spindle axis of the main spindle axis. Preferably, the machining spindle unit may be displaced vertically by means of the first guide. Furthermore, it may be displaced crosswise thereto by means of a second guide, preferably perpendicularly, especially preferably perpendicularly to a vertical. The machining spindle unit may be advanced to the work piece clamped into the main spindle unit for executing the desired machining.

Furthermore, the machining spindle unit may be swiveled around a swivel axis which is arranged crosswise, in particular perpendicularly to the main spindle axis and/or perpendicularly to the main spindle axis and the axis of rotation of the machining spindle unit, respectively. The machining spindle unit, thus, may be advanced to a clamped work piece at various angles. This enables execution of a plurality of machining methods. The generating machining tool is realized in the form of means with a single or a plurality of helically arranged machining elements, i.e. an arbitrary number of machining elements, in particular by a corresponding milling tool which milling tool may comprise two or more, i.e. an arbitrary number of windings.

As explained above, the spindle axis of the main spindle unit is disposed vertically in a preferred embodiment of the invention. However, in an alternative embodiment of the invention the main spindle unit is oriented such that the spindle axis is directed horizontally by respectively rotating the whole geometry of the machine.

The machining tool, i.e. the generating means, may have a cylindrical or concave or convex or tapered shape. The thread pitch may be selected arbitrarily, particularly also variable along the tool length. Within the scope of this invention, also use of such tools is intended, wherein the thread pitch varies along the length direction of the tool. The machining tool, i.e. the generating means, can be provided with defined and undefined cutting edges that are arranged in thread shape or worm shape. In a preferred embodiment of the invention a cutting tooth is provided as generating means which helically runs around a cylindrical base body which cutting tooth forms a continuous cutting edge. In addition or alternatively thereto also individual cutting teeth such as exchangeable indexable inserts may be used to develop a cutting edge. In the machining by means of an inventive machine tool, for example in a corresponding milling process, the generating means and the work piece cooperate like a worm gear depending on the pitch of the cutting edge of the generating means where rotation of the main spindle unit is synchronized with the rotation of the machining spindle unit to thereby obtain work piece geometries of uniform shape. By the machining process teeth or tooth gaps for a gear may be formed within a clamped work piece, in particular by hobbing. Preferably, synchronization is effected by means of an electronic control.

Preferably, the machining spindle unit can be positioned and/or locked in at least one arbitrarily specified swivel position. By swiveling the machining spindle unit around the swivel axis it is possible to implement any helix angle of the generated gap.

The swivel position of the machining spindle unit can be advantageously locked, optionally by means of a locking means, in particular by means of a clamping means and/or an indexable rotational locking means.

Advantageously, the rise of the cutting edge of the generating means is mainly compensated during machining by means of swiveling around the swivel axis.

Especially advantageously, the machining spindle unit has a counter-bearing, a counter-spindle or a guide means to guide a free and thus non-driven end of a clamped generating means, in particular hobbing means. The counter bearing is coupled to the machining spindle unit opposite to a clamping means which serves the driving of the tools. The non-driven end of the clamped generating means is then guided through the counter-bearing and is rotatably mounted. This stabilizes the rotation of the generating means during the machining, particularly milling and despite the lateral and/or possible tangential loads of the generating means such as through cutting impacts or high advancing speeds, the generating means is not displaced from its actual position. In this way, a higher precision is achieved in the machining of the clamped work piece.

Advantageously, the machining spindle unit can be shifted axially and/or tangentially by means of a preferably horizontal third guide that is positioned approximately parallel to the tool driving axis and especially perpendicular to the horizontal second guide, and can be advanced to a clamped work piece. I.e. with a shift of the machining spindle unit on the third guide, in the so-called shift-axis, the machining distance between the clamped work piece and the generating means clamped in the machining spindle unit remains the same. Because of the tangential shifting on the third guide different tool areas can be used, if for example an area of the cutting edge that is currently used for milling and may have suffered wear and tear is moved out of the machining area, and a previously unused (sharp) area of the cutting edge of the milling means is used for the further milling. By shifting the generating means continuously or at discrete values in time on the tangential axis, the entire machining area of the tool can be used evenly. This means that the entire cutting edge of the generating means is completely utilized and high service life of this means can be achieved.

The generating means is selected from a tool with an arbitrary number of machining elements for interlocking, it can in particular comprise at least a single-start or multi-start hob, single-start or multi-start skive hobs or generating grinding tools.

The main spindle unit has a clamping means to clamp a work piece to be machined. By clamping the work piece to be machined into the clamping means, one end of the work piece can remain freely accessible and can be machined with the machine tool of the machining spindle unit. In a preferred embodiment of the invention, the free end of the work piece may be supported when forming tooth gaps.

Especially advantageously, a vertically clamped work piece is machined with chip flow in the direction of gravity and/or from top to bottom so that any chips created in the machining are directly thrown in the direction of gravity and do not fall into the machining area of the generating means or on the guides. The reduced contamination allows a more precise machining of a work piece and also reduces the maintenance times required because of contaminated guides, for example. Advantageously, the work piece is clamped in a vertically standing fashion when machining a work piece with chip flow in the direction of gravity this can be realized in conventional or climb cut manner so as to absorb any pressure forces created in the machining by the tail stock. This stabilizes the position of the clamped work piece during the machining and results in a greater machining precision.

Preferably, the machine tool has a vertically displaceable spindle sleeve opposite to the first main spindle unit, or a vertically displaceable counter-spindle. By shifting the spindle sleeve or the counter-spindle, a longitudinal work piece such as a shaft, for example, can be clamped. In this way, it is avoided that the work piece is displaced from the clamped position during the machining, for example because of milling impacts or leverage. With a long shaft, for example, stabilization can be achieved in the machining by means of a counter-spindle. Within the scope of the invention it is also intended to stabilize shaft type work pieces by subjecting them to tensile loading. Alternatively or additionally, a machining of the end clamped previously or subsequently in the main spindle can be performed if the work piece is temporarily clamped in the counter-spindle.

In such a machining process, for example in a first machining step, a turning process may be effected where the work piece is coupled to the main spindle unit via appropriate clamping means at its upper axial end and is supported by a spindle sleeve or a vertically displaceable counter-spindle.

Following this first machining step the work piece may be subjected to a generating manufacturing, i.e. tooth generating machining step while being still supported by the already opened clamping means and being set into rotational movement by means of the (lower) counter-spindle around the spindle axis of the main spindle unit. Subsequently, the working piece may be machined at the upper axial end previously used for clamping to the clamping means when said clamping means are axially displaced from the work piece. By using a vertically displaceable spindle sleeve and/or a vertically displaceable counter-spindle, machining of the work piece along its entire length may be effected without the need of modifying the position of the working piece in the main spindle unit. To this end, it is of particular importance that the work piece is rotated around the same spindle axis by means of the main spindle unit and the spindle sleeve or the vertically displaceable counter-spindle without the need of effecting a translational movement of the work piece. This improves precision of machining.

Preferably, the machine tool has a machine body, in particular a machine frame to which the main spindle unit and/or a fourth guide or a fifth guide are rigidly connected. Thus, there is a stable coupling between the main spindle unit and the machine frame. In this way, any vibrations created in the machining are dampened by the heavy machine frame and the work piece can be machined with greater precision.

In accordance with the invention, a machine tool has a main spindle unit, a machining spindle unit as described above, and at least one further machining means. The further machining means can be arranged next to the spindle axis of the main spindle unit and on the side of the main spindle unit opposite to the machining spindle unit. The machining means can be shifted horizontally by means of a fifth guide and vertically by means of a fourth guide. In particular, the fourth and the fifth guide form a cross slide. The machining means can be advanced to a clamped work piece. By means of the machining spindle unit and the machining unit, a clamped work piece can also be machined simultaneously from more than one side. This results in less changeover time and less machining time per work piece. It is in particular not necessary to effect movements of the work piece between machining with the machining spindle unit on the one hand and the at least one machining means on the other hand. The work piece may remain clamped within the main spindle unit without any translational movement. Thereby stable mounting of the work piece and accordingly, a particular process stability may be ensured.

Advantageously, the machining means is arranged in a hanging fashion with respect to the fourth guide. This also results in the advantage that chips and coolant, if used, will not contaminate the guides of the machining means.

Advantageously, two or more machining means, in particular two machining means of the same type, are provided. In this way, the clamped work piece can be machined with two, three or more, if applicable different tools simultaneously, which again reduces the change-over time and the machining time per work piece.

Advantageously, at least one machining means is a turning machining means, a turret, grinding attachment, heating means like laser hardening device or multi-frequency induction hardening means or a pivotable spindle unit. By means of said heating means short term austenitization may be effected. In particular, the machining means has a handling means. By means of the handling means, a work piece to be machined can be advanced to the main spindle unit, and/or a work piece that has already been machined can be removed from the main spindle unit. To that end, a work piece conveyor system is advantageously associated with the main spindle unit. The work piece conveyor system can represent a stringing or non-stringing storage unit, for example a robot, a conveyor belt or a palette storage system. With the work piece conveyer system, the work pieces can be advanced to or removed from the main spindle unit in a time-saving fashion and preferably individually.

Within the scope of this invention it is of particular importance that the main spindle unit and the spindle sleeve or counter-spindle may be driven independently from each other.

The main spindle unit can be advantageously secured and/or locked in a standard turning position of the work piece by means of its drive or with an additional locking means. In an advantageous embodiment, the main spindle clamps the work piece into place in the center area or at an end.

In a particularly preferred embodiment of the invention the inventive machine comprises an arrangement for clamping work pieces, particularly shaft type work pieces, under tensile load, to thereby further improve the precision of machining by reducing bending of the work piece during machining.

It may be taken from the above examination of inventive machine tools that a method for machining a work piece having preferably a rotational symmetry by means of such machine tools is essentially characterized in that a work piece clamped into a main spindle unit of the machine tool is set into rotational movement with respect to a spindle axis of the main spindle unit and is subjected to generating machining by means of a rotating machine tool, wherein during machining the machine tool is subjected to translational movement with respect to the machine frame while the spindle axis of the main spindle unit remains fixed with view to the machine frame.

As explained above, by means of such machining particularly precise observation of given geometries may be effected without any limitation of possible work piece geometries, since the work piece itself is to be subjected to rotational movement only.

In executing an inventive method the work piece may be subjected to further machining prior to, during or after machining with the machining tool of the machining spindle unit with unchanged spindle axis of the main spindle unit (with respect to the machine frame) by means of a machining unit positioned next to the main spindle unit opposite to the machining spindle unit to thereby obtain a complete machining of the work piece without the necessity of transporting the work piece between two machine tools. Thereby, enhanced variability of the machine tool is obtained where it may be necessary that for obtaining enhanced variability a prolongation of machining time necessary for finalizing the machining process may be accepted.

In a particularly preferred embodiment of the invention the work piece is coupled to the main spindle unit at a first axial end portion with respect to the spindle axis of the main spindle unit by means of a clamping tool and is set into rotational movement with respect to the spindle axis of the main spindle unit and, during a second machining step, is set into rotational movement with respect to the spindle axis of the main spindle unit by means of a second clamping means coupled to a second axial end portion opposite to the first axial end portion. During this process the first clamping means may be displaced from the work piece in a radial and/or axial direction during the second machining step.

As may be taken from the above description of inventive machine tools, in an inventive method precision of machining may be improved by subjecting a work piece, in particular a shaft type work piece, to a tensile load during machining.

Figure 2:
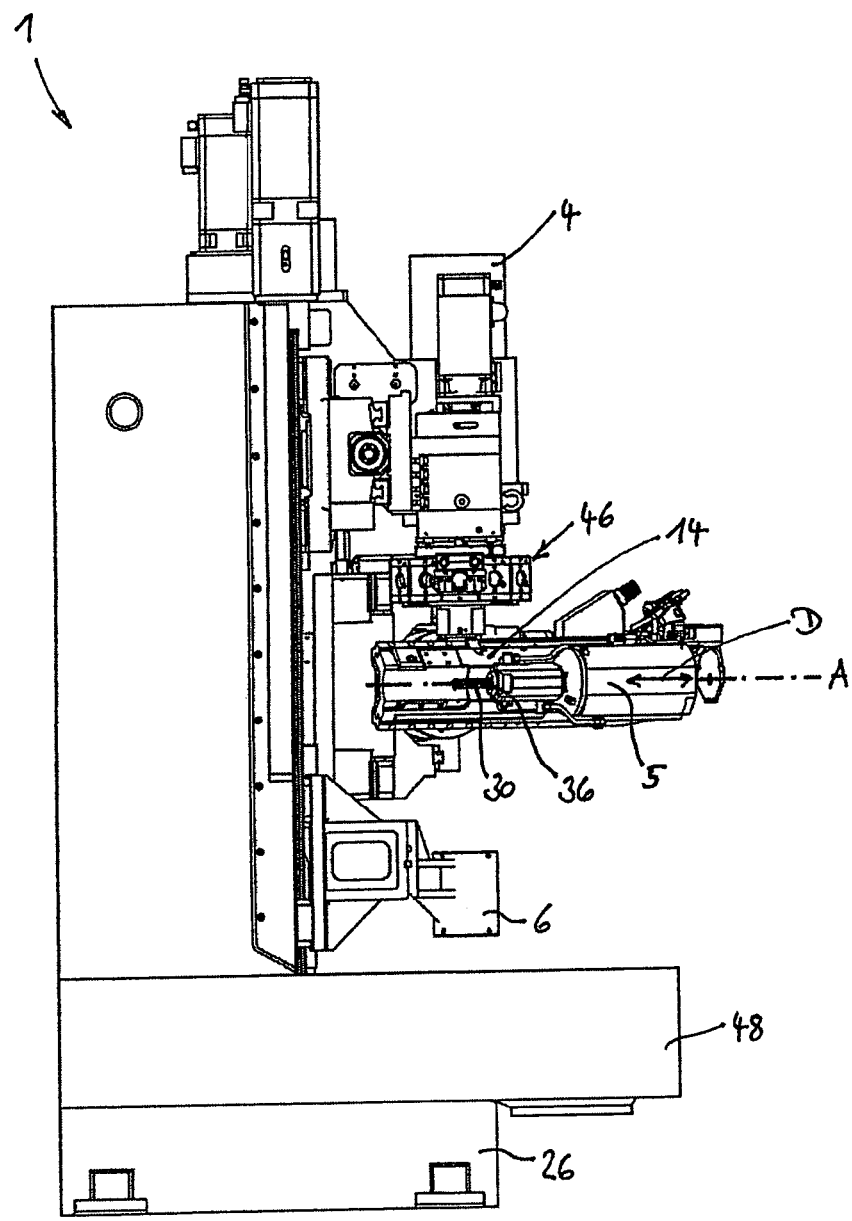
Figure 3:
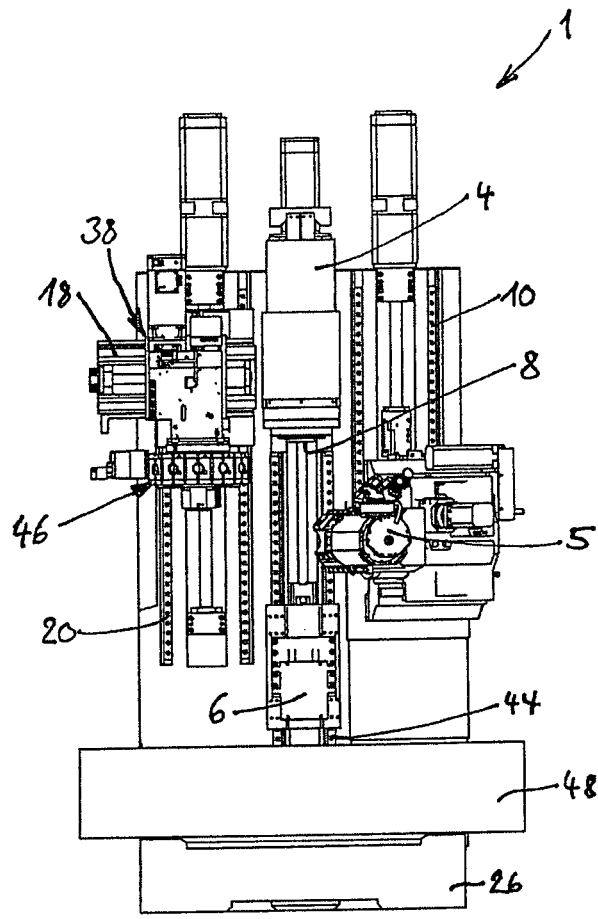
Figure 4:
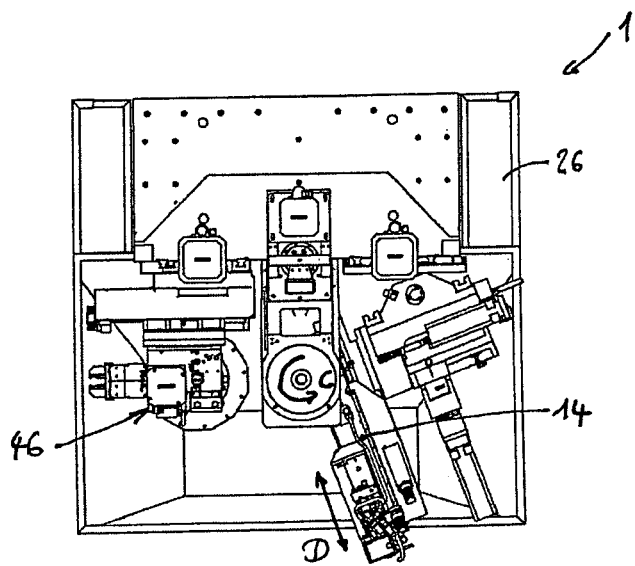
Figure 5:
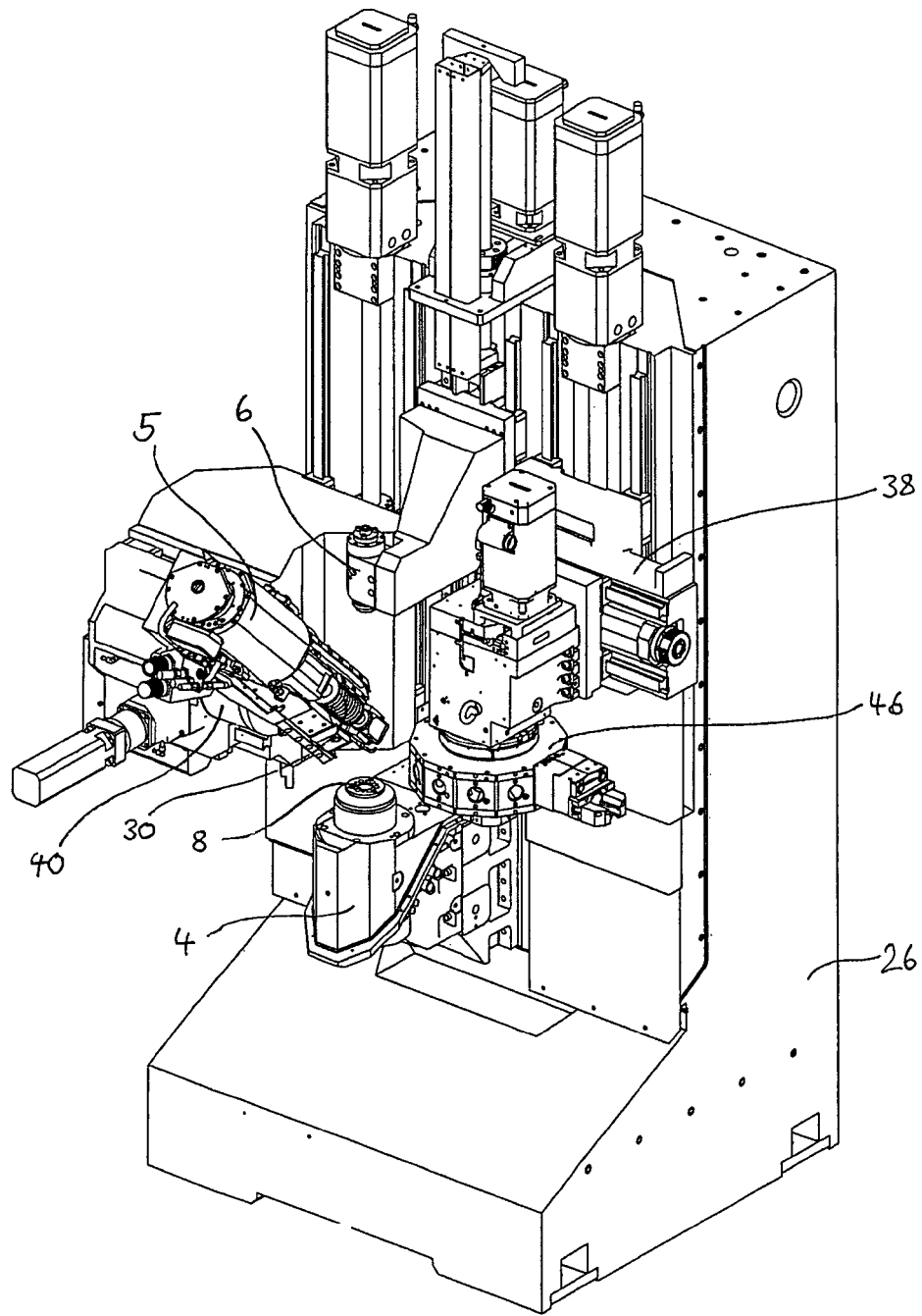

The embodiments of the invention are explained in greater detail using the figures, which show:

FIG. 1 the perspective view of a preferred embodiment of a machine tool,

FIG. 2 the lateral view of the machine tool in FIG. 1,

FIG. 3 the front view of the machine tool in FIG. 1,

FIG. 4 the top view of the machine tool in FIG. 1,

FIG. 5 the perspective view of an additional preferred embodiment of a machine tool.

FIG. 1 shows a perspective view of a preferred embodiment of a machine tool 1. A main spindle unit 4 is arranged in the upper area of a machine frame 26. The main spindle unit 4 has a rotary actuator with a vertically (z) running axis of rotation (C) and/or spindle axis. Furthermore, the housing of the main spindle unit 4 is rigidly connected to the machine frame 26 to ensure a stable coupling between the main spindle unit 4 and the machine frame 26.

To clamp a work piece (not shown) into the main spindle unit 4, one end of the work piece is chucked into a clamping chuck 8 (see FIG. 3) of the main spindle. In this way, work pieces can also be machined at the end that is not clamped. For stabilizing the work piece, for example longer work pieces, such as shafts, the main spindle unit 4 can have an opposite spindle sleeve 6 in axial direction. A work piece is clamped between the main spindle unit 4 and the spindle sleeve 6 by shifting the spindle sleeve 6 on a vertical sixth linear guide 44. The clamping between clamping chuck 8 and spindle sleeve 6 prevents a deflection or slipping of the clamped work piece due to machining forces, such as leverage milling impacts and impacts of interrupted cuts in the machining.

A tool spindle 5 (c.f. FIG. 2) and/or a machining spindle unit, in particular a hobbing spindle unit, are arranged next to the spindle axis of the main spindle unit 4. The tool spindle 5 can be shifted by means of a vertical (z) first linear guide 10 and a horizontal (x) second linear guide 12. The tool spindle 5 can be simultaneously shifted horizontally (x) and vertically (z) by means of the first and the second linear guide 10, 12. With a horizontal (y) or inclined third linear guide 14, the tool spindle 5 can be shifted parallel to the drive shaft of the generating means, i.e. the milling tool. Thus, a tool can be advanced to a clamped work piece from all directions. The tool spindle 5 is arranged laterally, hanging on the second linear guide 12. Because of the vertical arrangement of the main spindle unit 4 and the hanging guide of the tool spindle 5, the chips created during the machining fall downward from the machining area in direction of gravity without contaminating the guides of the tool spindle 5. Because of the vertical machining of the work piece a coolant which might be required, such as cooling water, oil-based or water-based coolant lubrication also flows vertically downward and thus the guides and compound rest slides are not at risk of being spattered.

The tool spindle 5 can be swiveled around a swivel axis B, which is positioned perpendicular to the spindle axis A of the tool spindle 5, by means of a swivel means 40. The swivel position of the tool spindle 5 with respect to the swivel axis B can be locked into an arbitrarily specified swivel position by means of a locking means, which can have a lockable serration or Hirth toothing. A tool 30 accommodated in the tool receptacle 36 (see FIG. 2) of the tool spindle 5 can be employed by shifting on the linear guides 10, 12, 14 and the swiveling around the swivel axis B under any angle relative to the spindle axis of the main spindle unit 4 or radially offset relative to the main spindle axis. Also during machining the tool spindle may be swiveled around the swivel axis B.

A tool 30 with a helically arranged cutting edge structure, such as a hobbing cutter, is clamped in the tool receptacle 36 of the tool spindle 5. To compensate for the rise of the helical hobbing, for example during the hobbing of straight teeth for a spur gear, the tool spindle 5 can be rotated around the swivel axis B. During the machining, the rotation of the main spindle 4 is coordinated with the rotation and/or swivel of the tool spindle depending on the rise of the hobbing cutter 30 and the circumference of the work piece. In this way, it is ensured that the milled gaps are evenly spaced. Furthermore, by means of swiveling of the hobbing cutter 30, any gaps running spirally around the work piece, as required for worm gears, for example, can be introduced.

During machining, only a small area of the clamped tool 30 is used and subjected to wear and tear. By means of the third linear guide 14, the tool spindle 5, including the tool, is shifted on a tangential axis and/or shift axis in a parallel direction to the tool spindle axis. In the shifting on the shift axis D, the machining distance between the tool 30 and the clamped work piece is retained, i.e., the milling depth or the milling angle do not change. However, an already used or possibly worn-out area of the generating tool is moved out of the machining zone axially and an unused (sharp) area of the generating tool is used for the further gearing. The shifting occurs continuously or at specific time intervals.

A vertical fourth linear guide 20 is arranged parallel to the vertical first linear guide 10 next to the main spindle unit 4. The vertical fourth linear guide 20, as the first linear guide 10, is rigidly connected to the machine frame 26. A turret 46 is arranged at the fourth linear guide 20. On the fourth linear guide 20 a fifth linear guide 18 is mounted perpendicularly to the fourth linear guide 20, through which a horizontal movement becomes possible. On this compound rest slide a turret 46 is mounted. The turret 46 can be shifted on the fourth linear guide 20 parallel (z) to the spindle axis of the main spindle unit 4. The turret 46 can be shifted horizontally (x) by means of a fifth linear guide 18. The fourth linear guide 20 and the fifth linear guide 18 are developed as compound rest slide 38, and the turret 46 is guided on the compound rest slide 38 in a hanging fashion. To machine a work piece that is clamped into the main spindle unit 4, the turret 46 can be advanced to the clamped work piece. The clamped work piece can be machined parallel with the turret 46 and the generating tool 30 clamped into the tool spindle 5.

FIG. 2 shows the lateral view of the machine tool 1 of FIG. 1. Here, the axis of the tool spindle 5 is aligned perpendicularly to the spindle axis of the main spindle unit. It is quite obvious that different areas of the clamped generating tool 30 are used in the machining by shifting on the shift axis D and/or tangential axis Y. By means of the turret 46 and the machining spindle 5 a work piece can be machined simultaneously from several sides and at various heights.

FIG. 3 shows the front view of the machine tool in FIG. 1. Because the turret 46 is arranged in a hanging fashion and the lateral hanging arrangement of the tool spindle 5, chips created in the machining as well as any coolant can fall directly into the catching tub 48 without contaminating the guides of the machine tool. FIG. 4 shows the top view of the machine tool 1 in FIG. 1

FIG. 5 shows a perspective view of another preferred embodiment of a machine tool. In this embodiment, the position of the tool spindle 5 and the position of the turret are interchanged. The main spindle unit 4 is arranged at the bottom, and thus a clamped work piece (not shown) can be machined in a vertically standing fashion. With the milling tool 30 clamped in the tool spindle 5, a clamped work piece is preferably machined from top to bottom so that any chips created in the machining fall and/or are thrust directly downward in direction of gravity and do not reenter the machining area of the generating tool 30. The cutting forces that occur in the machining from top to bottom are absorbed by the main spindle unit 4 and/or driveable spindle sleeve 6 and thus ensure a stable machining position of the work piece. This stability during the machining then again leads to a high degree of precision in the machining.

LIST OF REFERENCE SYMBOLS

1 Machine tool
4 Main spindle unit
5 Tool spindle
6 Spindle sleeve
8 Clamping chuck
10 First linear guide
12 Second linear guide
14 Third linear guide
18 Fifth linear guide
20 Fourth linear guide
26 Machine frame
30 Milling tool
36 Tool receptacle
38 Compound rest slide
40 Swivel means
44 Sixth linear guide
46 Turret
48 Catching tub
A Swivel axis
B Spindle axis
C Direction of rotation
D Direction of shift (third linear axis)

The invention claimed is:

1. Machine tool for machining a work piece having a main spindle unit (4) with a main spindle axis (C), and a machining spindle unit (5) with a machining spindle axis (A) arranged next to the spindle axis in a direction crosswise to the spindle axis to accommodate a machining tool (30), with said machining spindle unit (5)
being displaceable along a first guiding direction (Z) by means of a first guide (10) and being crosswise displaceable along a second guiding direction (X) by means of a second guide (12),
said machining spindle unit (5) being capable to advance to a work piece clamped in the main spindle unit (4), and
said machining spindle unit (5) being capable to swivel around a swivel axis (B) perpendicular to the spindle axis (A) of the machining spindle unit (5), and
with the machining tool (30) having an arbitrary number of helically arranged machining elements adapted to execute generating teeth manufacturing methods, whereby said machining spindle (5) is advanced to a clamped work piece by means of a third guide (14) perpendicular to the second guide (12), parallel to the spindle axis (A) of the machining spindle unit (5), wherein the third guide (14) is swiveled together with the machining spindle unit (5).

2. Machining tool in accordance with claim 1, characterized in that the machining tool comprises a single- or multi threaded milling tool.

3. Machine in accordance with claim 1 with the rotation of the main spindle unit (4) being synchronized with the rotation of the machining spindle unit (5).

4. Machine in accordance with claim 1 with the machining spindle unit (5) being positionable and/or lockable around the swivel axis (B) in at least one specified swivel position.

5. Machine in accordance with claim 1 with the machining spindle unit (5) having at least one locking means to lock and/or clamp the machining spindle unit (5) into at least one specified swivel position around the swivel axis (B).

6. Machine in accordance with claim 5 with the locking means being a clamping means and/or an indexable rotation locking means serration or Hirth toothing.

7. Machine in accordance with claim 1 with a rise in the helically arranged machining tool being compensated by means of the swivelling around the swivel axis (B) during machining.

8. Machine in accordance with claim 1 with the machining spindle unit (5) having a counter-bearing, a counter-spindle or a guide means to guide a free and/or non-driven end of a clamped machining tool (30).

9. Machine in accordance with claim 1 with the machining tool (30) being displaceable tangentially to a clamped work piece by means of the third guide (14) in a shift direction (D).

10. Machine in accordance with claim 1 with the teeth generating machining tool being a single- or multi-pitched hob or skive hob or threaded wheel grinding.

11. Machine in accordance with claim 1 with the main spindle unit (4) having a clamping means (8) to clamp a work piece.

12. Machine in accordance with claim 1 with a displaceable tail stock (6) or a displaceable counter-spindle being arranged opposite the main spindle unit (4).

13. Machine in accordance with claim 1 having a machine frame to which at least one of the main spindle unit (4), the first guide (10) and the second guide (20) are rigidly connected.

14. Machine tool for machining a work piece, having
a main spindle unit (4) having a main spindle axis (C),
a machining spindle unit (5) with a machining spindle axis A arranged next to a spindle axis of the main spindle unit (4) in a direction crosswise to the spindle axis of the main spindle unit to accommodate a machining tool (30), with the machining spindle unit (5) being displaceable by means of a first guide (10) along a first guiding direction and being crosswise displaceable along a second guiding direction by means of a second guide (12) and being capable of swivelling around a swivel axis (B) extending perpendicular to the spindle axis (A) of the machining spindle unit (5),
at least one machining means that is arranged next to the spindle axis of the main spindle unit and opposite to the machining spindle unit (5), with the machining means being displaceable by means of a fifth guide (18) and/or by means of a fourth guide (20), said fifth guide extending perpendicular to said fourth guide, and said fourth guide extending parallel to the first guiding direction,
with the machining spindle unit (5) and/or the machining means being capable of advancing to a work piece clamped in the main spindle unit (4), and
with the machining tool (30) having a generating tool adapted to execute a generating teeth forming process, said generating tool comprising a single or multi-pitched, threaded tool, whereby said machining spindle (5) is advanced to a clamped work piece by means of a third guide (14) perpendicular to the second guide (12), parallel to the spindle axis (A) of the machining spindle unit (5), wherein the third guide (14) is swiveled together with the machining spindle unit (5).

15. Machine in accordance with claim 14, with at least one machining means that is arranged in a hanging fashion relative to the fourth guide (20).

16. Machine in accordance with claim 14 with at least two machining means being provided, said at least two machining means being of the same type.

17. Machine in accordance with claim 14 with at least one machining means having at least one turning machining means, at least one turret (46), at least one grinding attachment, at least one laser hardening device, at least one press roller edge device, at least one positioning device, at least one indexing device, at least one gear cutting skiving device, at least one grinding device, at least one marking device and/or at least one swivelling spindle unit.

18. Machine in accordance with claim 14 with the machine tool having a handling means for feeding a work piece into or removing it from the main spindle unit (4).

19. Machine in accordance with claim 14 with the vertical main spindle unit (4) being arranged at the bottom of the machine body (26) to clamp a work piece in a standing fashion, and the direction of machining of the machining spindle unit (5) essentially running vertically from top to bottom or from bottom to top with chip flow during the generating process in the direction of gravity.

20. Machine in accordance with claim 14 with an arrangement for clamping shaft type work pieces under tensile load.

21. Method for machining a work piece, with a machine tool according to claim 14 wherein the work piece as clamped into the main spindle unit of the machine tool is set into rotational movement around a spindle axis of the main spindle unit and is subjected to a generating tool forming machine with a machining tool rotating with respect to a spindle axis of a machining spindle unit, characterized in that the machining tool is subjected to translational movement with respect to a machine frame during machining with the spindle axis of the main spindle unit remaining fixed with respect to the machine frame of the machine tool.

22. Method according to claim 21, characterized in that the work piece is subjected to further machining prior to, during and/or after machining with the machine tool of the machining spindle unit with the spindle axis of the main spindle unit remaining unchanged with respect to the machine frame, said further machining being effected with a machining unit arranged next to the main spindle unit opposite to the machining spindle unit.

23. Method according to claim 21 characterized in that the work piece is coupled to the main spindle unit at a first axial end portion with respect to the spindle axis of the main spindle unit by means of clamping means during a first machining step and is set into rotational movement and is set into a rotational movement around a spindle axis of the main spindle unit during a second machining step by means of a second clamping means coupled to the work piece at a second axial end portion opposite to the first axial end portion.

24. Method according to claim 23, characterized in that the first clamping means is removed from the work piece during the second machining step in a radial or axial direction.

25. Method according to claim 21 wherein a work piece of preferably shaft-like shape which is clamped into a main spindle unit of a machine tool and having rotational symmetry is subjected to generating teeth manufacturing machining, characterized in that the work piece is subjected to tensile load with respect to the spindle axis of the main spindle unit during at least a certain period of time of machining.

* * * * *